(12) United States Patent
Lewis

(10) Patent No.: US 11,578,771 B2
(45) Date of Patent: Feb. 14, 2023

(54) CALIPER ACTUATED WHEEL END SPHERE BRAKES

(71) Applicant: Lewis Designs, LLC, Waterford, PA (US)

(72) Inventor: Aaron J. Lewis, Erie, PA (US)

(73) Assignee: Lewis Designs, LLC, Waterford, PA (US)

( * ) Notice: Subject to any disclaimer, the term of this patent is extended or adjusted under 35 U.S.C. 154(b) by 97 days.

(21) Appl. No.: 16/636,304

(22) PCT Filed: Aug. 3, 2018

(86) PCT No.: PCT/US2018/045133
§ 371 (c)(1),
(2) Date: Feb. 3, 2020

(87) PCT Pub. No.: WO2019/028329
PCT Pub. Date: Feb. 7, 2019

(65) Prior Publication Data
US 2020/0191217 A1     Jun. 18, 2020

Related U.S. Application Data

(60) Provisional application No. 62/541,492, filed on Aug. 4, 2017.

(51) Int. Cl.
| | |
|---|---|
| *F16D 65/22* | (2006.01) |
| *B60B 1/04* | (2006.01) |
| *F16D 51/22* | (2006.01) |
| *F16D 51/00* | (2006.01) |
| *F16D 125/30* | (2012.01) |
| *F16D 125/56* | (2012.01) |

(52) U.S. Cl.
CPC .............. *F16D 65/22* (2013.01); *B60B 1/041* (2013.01); *F16D 51/22* (2013.01); *F16D 2051/003* (2013.01); *F16D 2125/30* (2013.01); *F16D 2125/56* (2013.01)

(58) Field of Classification Search
CPC ............... F16D 51/22; F16D 2051/003; F16D 2125/30; F16D 2125/56; B60B 1/041
See application file for complete search history.

(56) References Cited

U.S. PATENT DOCUMENTS

| | | | |
|---|---|---|---|
| 1,731,499 A | 10/1929 | Myers | |
| 3,618,715 A * | 11/1971 | Bostwick | ................ F16D 65/60 188/79.55 |
| 2007/0034457 A1 | 2/2007 | Kim | |

(Continued)

FOREIGN PATENT DOCUMENTS

DE      4438591 A1 *   5/1996   ........... H01H 33/668

OTHER PUBLICATIONS

PCT, International Search Report and Written Opinion, International Application No. PCT/US2018/045133; dated Dec. 14, 2020, 6 pages.

*Primary Examiner* — Melody M Burch
(74) *Attorney, Agent, or Firm* — Thompson Hine LLP

(57) ABSTRACT

A braking system is presented that comprises a brake sphere rotor that is mounted to the wheel hub of an axle. The braking system incorporates a caliper arm assembly that comprises at least one caliper arm. Each caliper arm further comprises hemispherical friction material located between the caliper arm and the brake sphere rotor.

16 Claims, 8 Drawing Sheets

(56) References Cited

U.S. PATENT DOCUMENTS

| | | | |
|---|---|---|---|
| 2011/0132701 A1* | 6/2011 | Lewis | B60T 1/062 188/78 |
| 2015/0069818 A1* | 3/2015 | Hester | B60B 27/0052 301/6.8 |
| 2015/0167762 A1 | 6/2015 | Tiger | |
| 2016/0333953 A1 | 11/2016 | Lewis | |

* cited by examiner

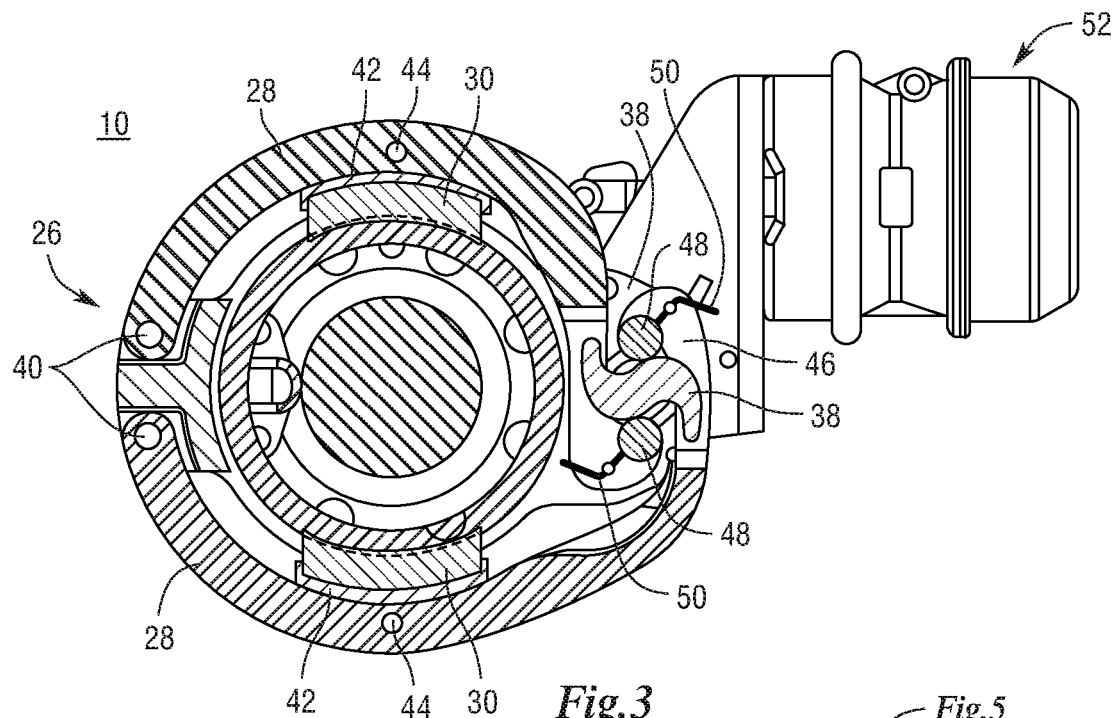
Fig.3
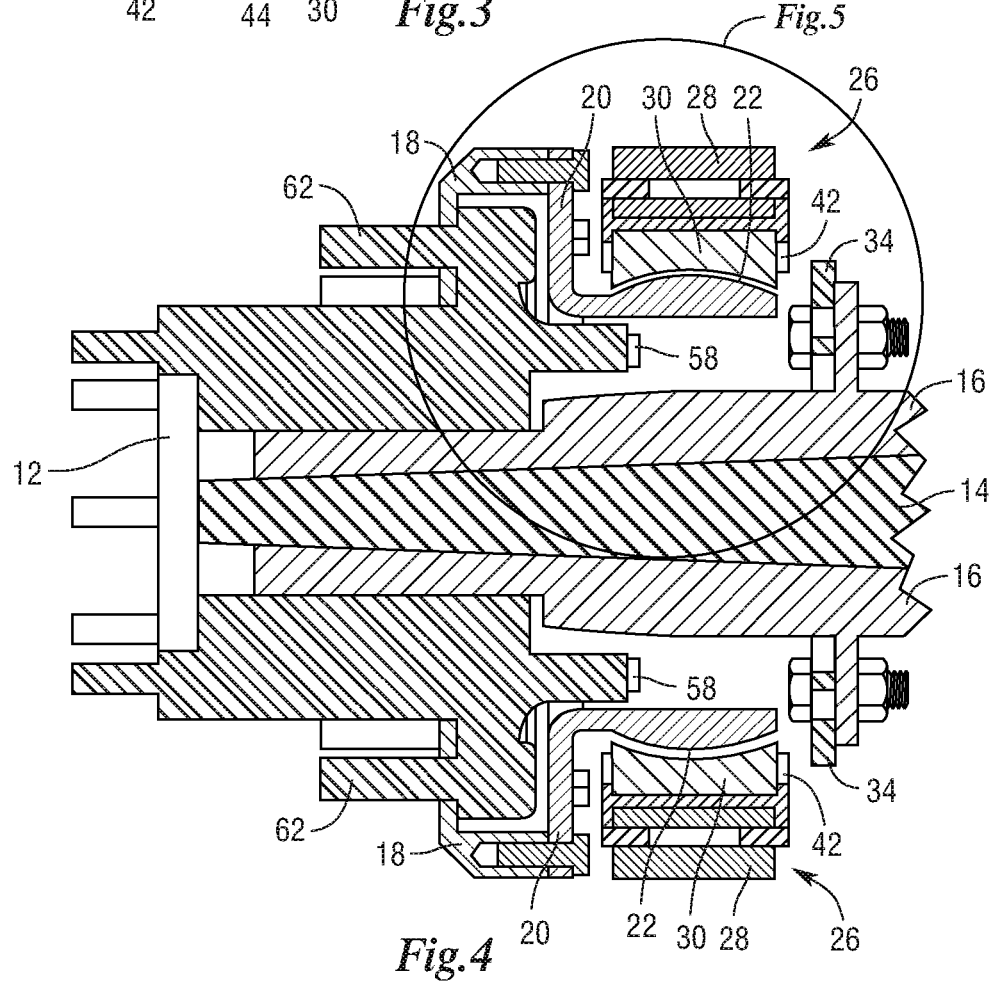
Fig.5
Fig.4

CALIPER ACTUATED WHEEL END SPHERE BRAKES

This invention was made with government support under contract no. M6785419C6515 awarded by Marine Corps Systems Command. The government has certain rights in the invention.

BACKGROUND

Sphere brake systems represent a marked improvement over traditional disk and drum brake systems. They are generally smaller in dimension but provide significantly better braking performance and lower maintenance requirements than standard disc brakes. Sphere brake systems are typically mounted to drive shafts and axles of vehicles. What is presented is an improved system for applying braking pressure to such sphere brake systems to slow down operating drive shafts and axels.

SUMMARY

What is presented is a braking system comprising a brake sphere rotor that is mounted to the wheel hub of an axle. A caliper arm assembly is incorporated that comprises at least one caliper arm. Each caliper arm further comprises hemispherical friction material located between the caliper arm and the brake sphere rotor.

The caliper arm assembly is actuated by one of mechanical power, pneumatic power, electric power, or hydraulic power. A support bracket assembly is mounted to the axle housing to supports a camshaft tube, and a camshaft. The caliper arm assembly is mounted to the support bracket and connected to the camshaft.

The caliper arm assembly activates to press the hemispherical friction material against the brake sphere rotor. The number of caliper arms can be varied by the particular application, but the preferred embodiment comprises a pair of arms on opposing sides of the sphere brake rotor. In addition, the hemispherical friction material may be installed within a brake shoe and that is mounted to the caliper arm. This allows for easier replacement of the hemispherical friction material.

The braking system may be retrofitted to fit on existing wheel systems which are typically larger than sphere brake systems and, in such cases, a rotatable hub adapter is mounted to the wheel hub between the brake sphere rotor and the wheel hub.

In various embodiments, of the braking system the caliper arm assembly may be located external to the brake sphere rotor or internally to the brake sphere rotor.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

FIG. 3 is a cross-section view of the caliper actuated sphere braking system of FIG. 1;

FIG. 4 is another cross-section view of the caliper actuated sphere braking system of FIG. 1;

DETAILED DESCRIPTION

Figure 1:
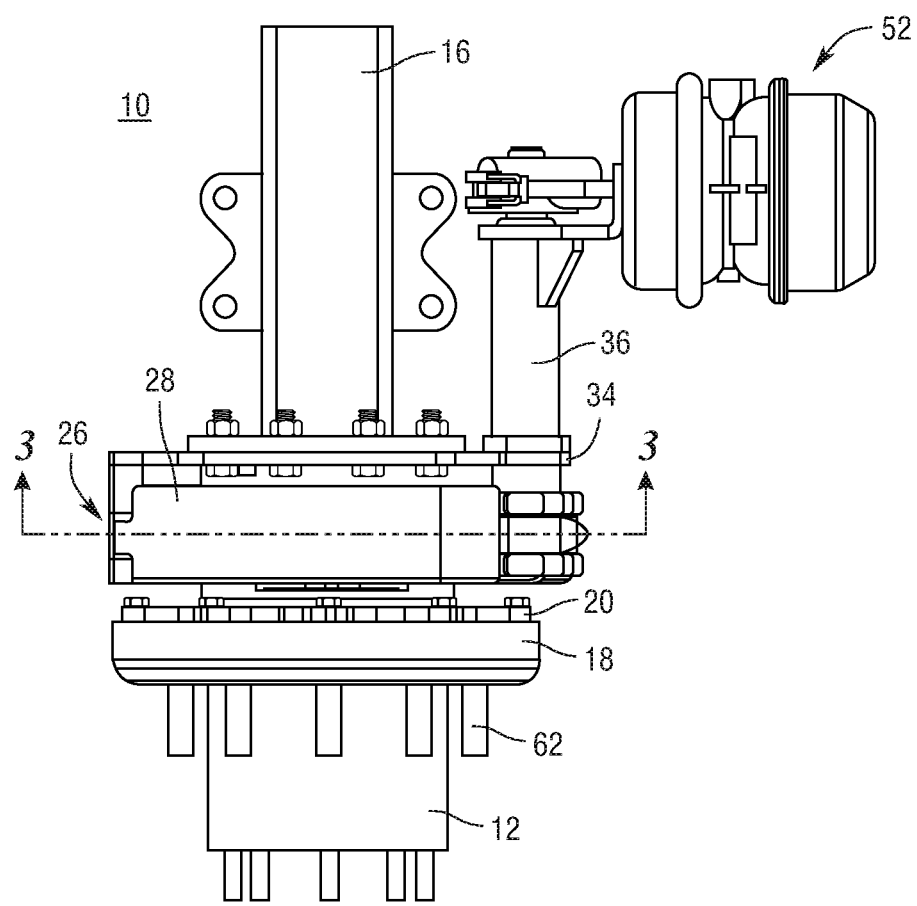
FIG. 1 is a top view of one embodiment of a caliper actuated sphere braking system that incorporates a hub adapter.
Figure 2:
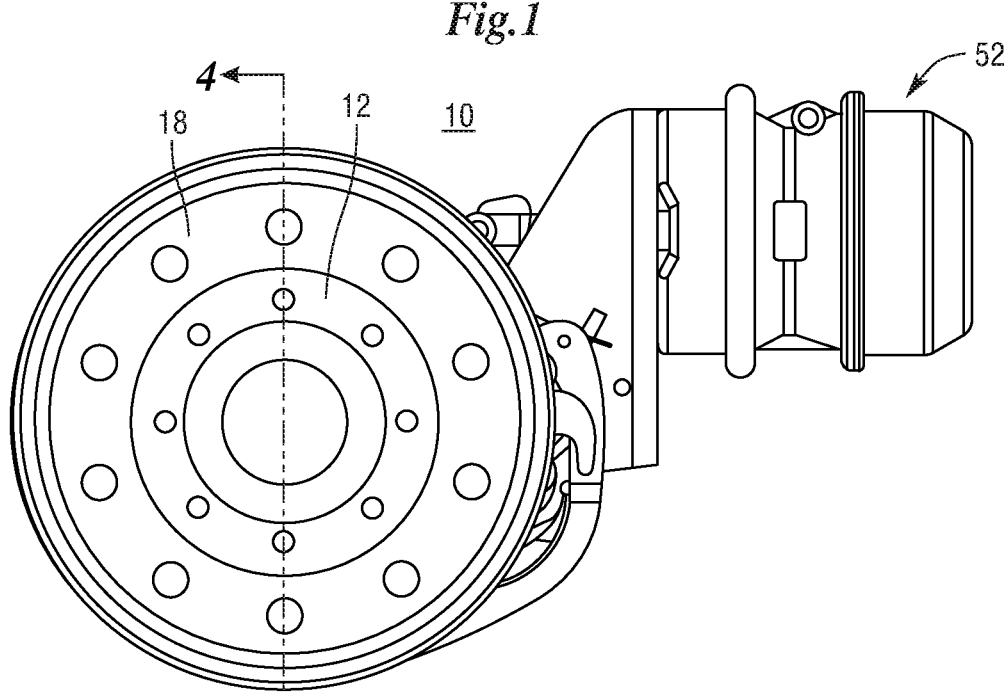
FIG. 2 is a front view of the caliper actuated sphere braking system of FIG. 1.
Figure 5:
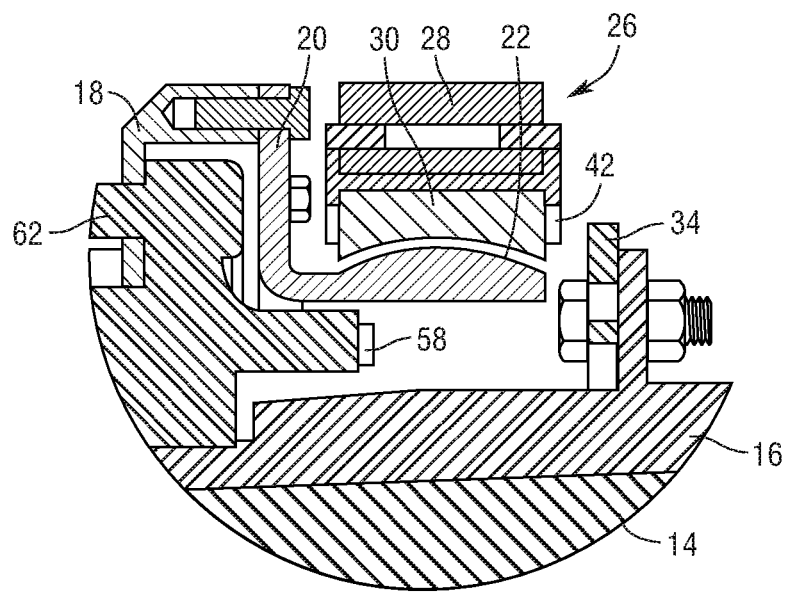
FIG. 5 is a close-up view of a portion of the caliper actuated sphere braking system of FIG. 4.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

The sphere braking systems disclosed herein are systems that could be retrofitted to replace the brake systems of existing systems or could be built into newly constructed vehicles. Referring to FIGS. 1-5, the braking system 10 shown is that which is retrofitted to replace a vehicle's existing brake system. The vehicle's existing brake system is removed (not shown) to reveal the wheel hub 12 that is carried on an axle 14 which could be a drive axle or a steer axle of vehicle. An engine (not shown) rotates the axle 14 that rotates the wheel hub 12. The axle 14 is located within a stationary axle housing 16 that the axle 14 rotates through. Because the wheel hub 12 is configured for traditional braking systems, a rotatable hub adaptor 18 is required to be mounted to the wheel hub 12. This allows the braking system 10 to be mounted to the wheel hub 12 by mounting it to hub adapter 18. The braking system 10 comprises a brake sphere rotor 20 that has a lining or shell 22 that has an angular covering between 1 and 180 degrees of the brake sphere rotor 20. A portion of this shell 22 serves as the area against which pressure is applied to slow to rotation of the brake sphere rotor 20. This pressure application area is between 1 and 180 degrees of the brake sphere rotor 20. The sphere arc of the shell 22 is between 1 and 359 degrees of the wheel hub 12.

The stopping force against the brake sphere rotor 20 is applied by a caliper arm assembly 26. The caliper arm assembly comprises at least one caliper arm 28. The embodiment shown in the drawings shows two caliper arms 28 on either side of the brake sphere rotor 20 but those of ordinary skill in the art can easily see that the number and orientation of caliper arms 28 may be varied without deviating from the scope of the disclosure. Each caliper arm 28 further comprises hemispherical friction material 30 that is located between the caliper arm 28 and the brake sphere rotor. In the inoperative configuration, the hemispherical friction material 30 of the caliper arm assembly 26 does not engage the shell 22 of the brake sphere rotor 20. In the operative configuration, the caliper arm assembly 26 engages the shell 22 of the brake sphere rotor 20 to slow down the rotation of the brake sphere rotor 20.

The hemispherical friction material 30 is shaped to conform to the surface of the brake sphere rotor 20. The hemispherical friction material 30 may be mechanically or chemically bonded to the brake shoe 42. The hemispherical friction material 30 may comprise organic and/or metallic material. In the embodiment shown in the figures, the hemispherical friction material 30 is further mounted to a quick release brake shoe assembly 42 which are mounted to the caliper arms 28 with a brake shoe pin 44. Each caliper arm may include a recess (not shown) sized to locate and seat the brake shoe 42. This allows for quick and relatively easy replacement of the hemispherical friction material 30 as needed for regular maintenance of the braking system 10.

The caliper arm assembly 26 is mounted on a stationary support bracket 34 that is in turn mounted to the axle housing 16. The support bracket 34 support a camshaft tube 36, a camshaft 38, the caliper arm assembly 26, and an ABS sensor bracket (not shown). The embodiment of caliper arm assembly 26 shown in the figures comprises one caliper arms 28, caliper arm hinge pins 40, cam roller prongs 46, the cam roller 48, and the roller clip 50. The caliper arm assembly is mounted to engage the hemispherical friction material 30 on the brake sphere rotor 20 and to engage the cam roller prongs 46, the cam roller 48, and the roller clip 50 around the camshaft 38. The roller clips 50 secure the cam rollers 48 to the cam roller prongs 46 of the caliper arms 28. Actuation of the camshaft 38 by a vehicle's brake control system causes the caliper arm assembly 26 to compress and press the hemispherical friction material 30 against the brake sphere rotor 20 which will slow down the rotation of the brake sphere rotor 20. Actuation may be affected by pneumatics, hydraulics, electronics, or any other means that will allow the rotation of the camshaft 38 and subsequent compression of the caliper arm assembly 26 against the brake sphere rotor 20. In the embodiment shown in the figures, activation is accomplished pneumatically via a source of pressurized air 52. The brake shoe 42 and the hemispherical friction material 30 allows for self-centering to the brake sphere rotor 20 when actuated. The source of pressurized air 52 communicating pressure from an outside source to the camshaft 38 causes an application of force to the caliper arm assembly 26 so that the brake shoe 42 engages with opposite radial forces of the brake sphere rotor 20 to slow a vehicle by causing friction between shell 22 of the brake sphere rotor 20 and the hemispherical friction material 30.

This configuration allows quick and easy replacement of the hemispherical friction material 30 without removal of the wheels. A user would first disconnect the source of pressurized air 52, then remove the caliper arm hinge pins 40 and the brake shoe pin 44 which allows removal and replacement of the brake shoe 42 with fresh hemispherical friction material 30.

Figure 6:
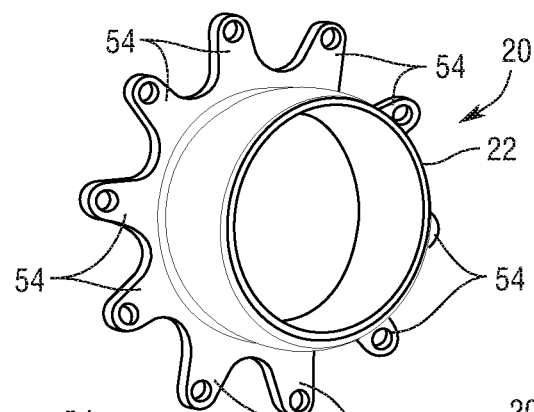
FIG. 6 is a perspective view of a sphere brake rotor.
Figure 7:
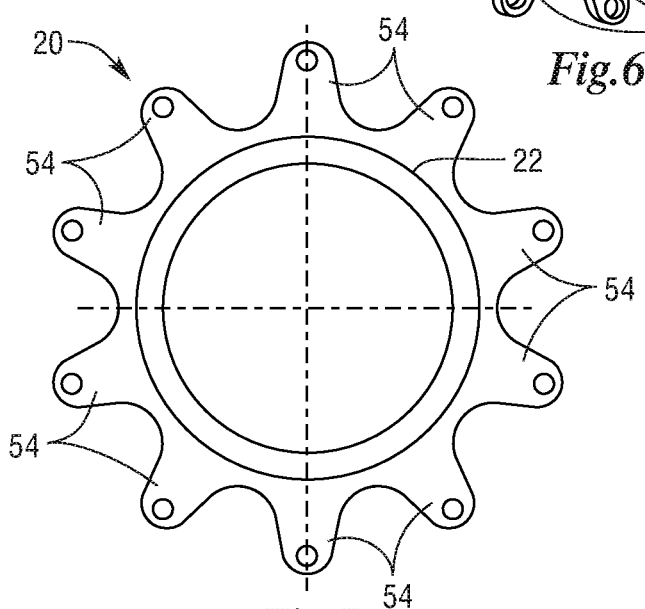
FIG. 7 is a front view of the sphere brake rotor of FIG. 6.
Figure 8:
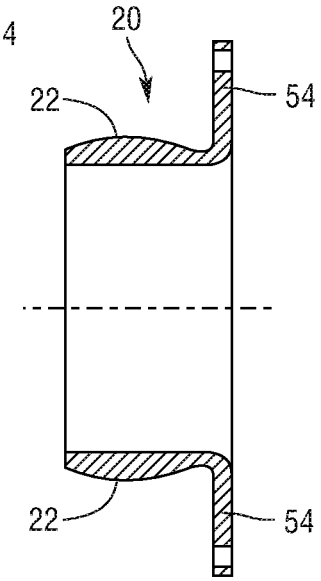
FIG. 8 is a cross-sectional view of the sphere brake rotor of FIG. 6.

As shown in FIGS. 6, 7, and 8, the brake sphere rotor 20 is preferably constructed of metallic material and has radially placed mounting spokes 54 for mounting to the hub adapter 18, as shown and discussed previously. The open spaces between the mounting spokes 54 enhance the flow of air past the shell 22 of the brake sphere rotor 20, enhancing dissipation of heat. This configuration also reduces the overall weigh of the brake sphere rotor 20. As discussed earlier, the sphere brake rotor 20 is mounted to the hub adapter 18 which is in turn mounted to the wheel hub 12. As can be seen best by comparing FIGS. 5 and 7, the inner diameter of the sphere brake rotor 20 allows clearance for a toe wheel 58 that interfaces with an anti-lock brake system (ABS) sensor (not shown) mounted in an ABS bracket (not shown) which is mounted on the support bracket 34.

Figure 9:
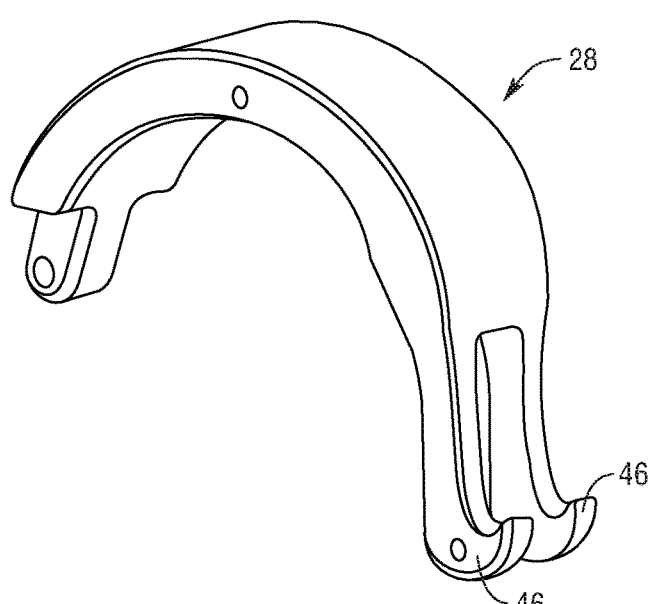
FIG. 9 is a perspective view of a caliper arm.

FIG. 9 shows a perspective view of one caliper arm 28 of the caliper arm assembly 26. Comparing FIG. 9 to FIG. 3, it is apparent that the camshaft 38 sits between the interlocking pair of caliper arms 28 and that each caliper arm 28 accommodates the cam oiler 48. Actuation of the camshaft 28 pulls each caliper arm 28 towards the other and compresses the hemispherical friction material 30 against the shell 22 of the sphere brake rotor 20.

Figure 10:
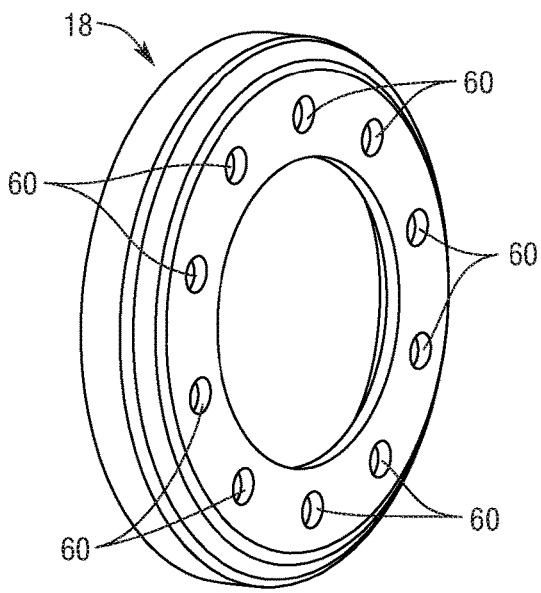
FIG. 10 is a perspective view of a hub adapter.
Figure 11:
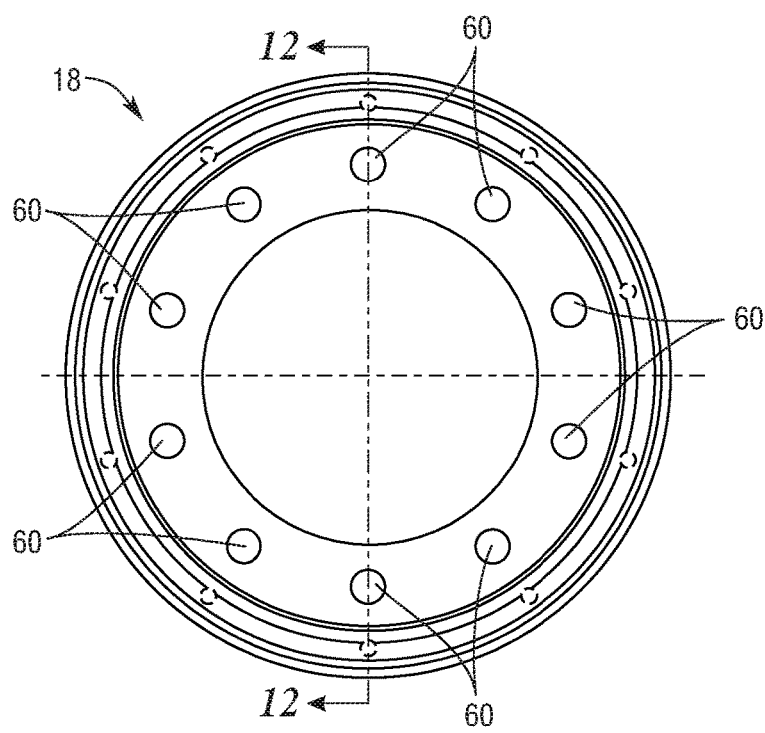
FIG. 11 is a front view of the hub adapter of FIG. 10.
Figure 12:
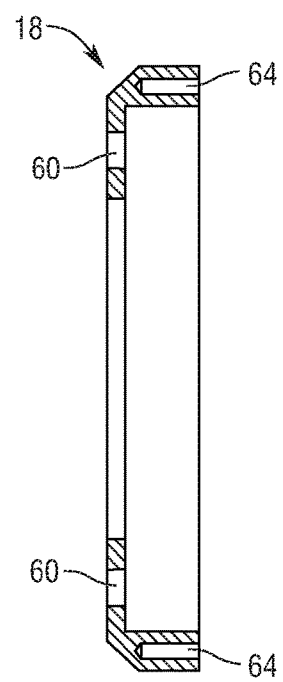
FIG. 12 is a cross-sectional view of the hub adapter of FIG. 10.

FIGS. 10, 11, and 12, show the configuration of the hub adapter 18 that is used to retrofit the sphere braking system 10 to existing vehicles. It would not be needed for vehicles that are designed and built for sphere braking system 10. As best understood by comparing FIGS. 4, 5, and 12, hub adapter has a series of the adapter mounting openings 60 that are sized and aligned to fit over the existing wheel hub bolts 62 of a vehicle. The hub adapter 18 has a series of sphere brake mounting openings 64 that are sized and aligned to correspond to openings in the mounting spokes 54 of the sphere brake rotor 20 (best seen in FIGS. 6 and 7).

Figure 13:
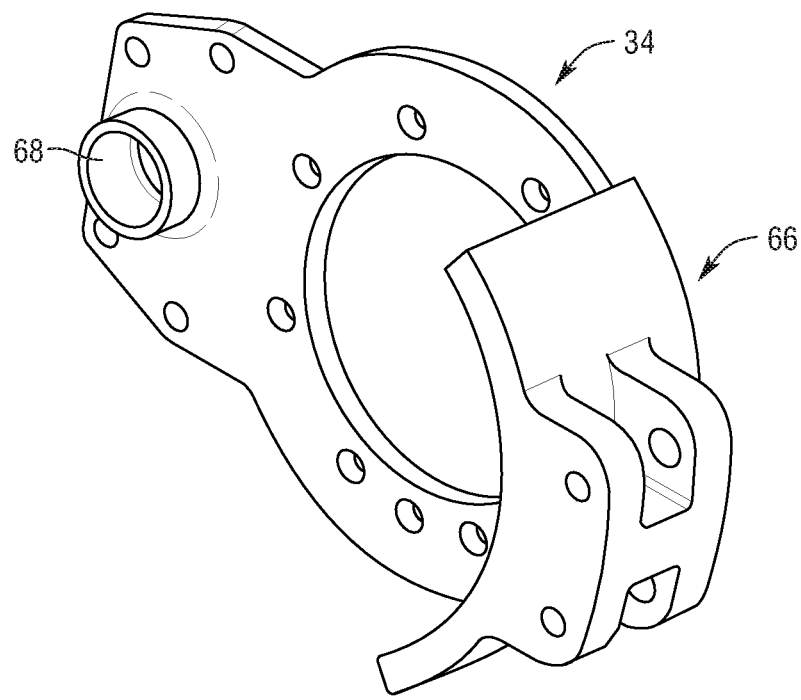
FIG. 13 is a perspective view of a support bracket.

FIG. 13 shows a perspective view of the support bracket 34 that supports and connects the caliper arm assembly 26, the camshaft tube 36, camshaft 38, and the ABS sensor bracket (not shown) to the stationary axle housing 16. The support bracket 34 has openings to mount it to the axle housing 16. A caliper mounting bracket 66 has openings to accommodate the caliper arm hinge pins 40 (as shown in FIG. 1). The camshaft opening 68 supports camshaft 38 and its related appurtenances when it is connected to the caliper arm assembly 26 (best seen in FIG. 2).

FIGS. 14-18 show another embodiment of the braking system 10a in which the wheel hub 12a of the vehicle is properly sized to accept the braking system 10a. In this embodiment, there is hub adapter and the braking system 10a is mounted directly to the wheel hub 12a with wheel hub bolts 62a. All other features and functions of the braking system 10a are similar to the embodiments earlier discussed.

Figure 14:
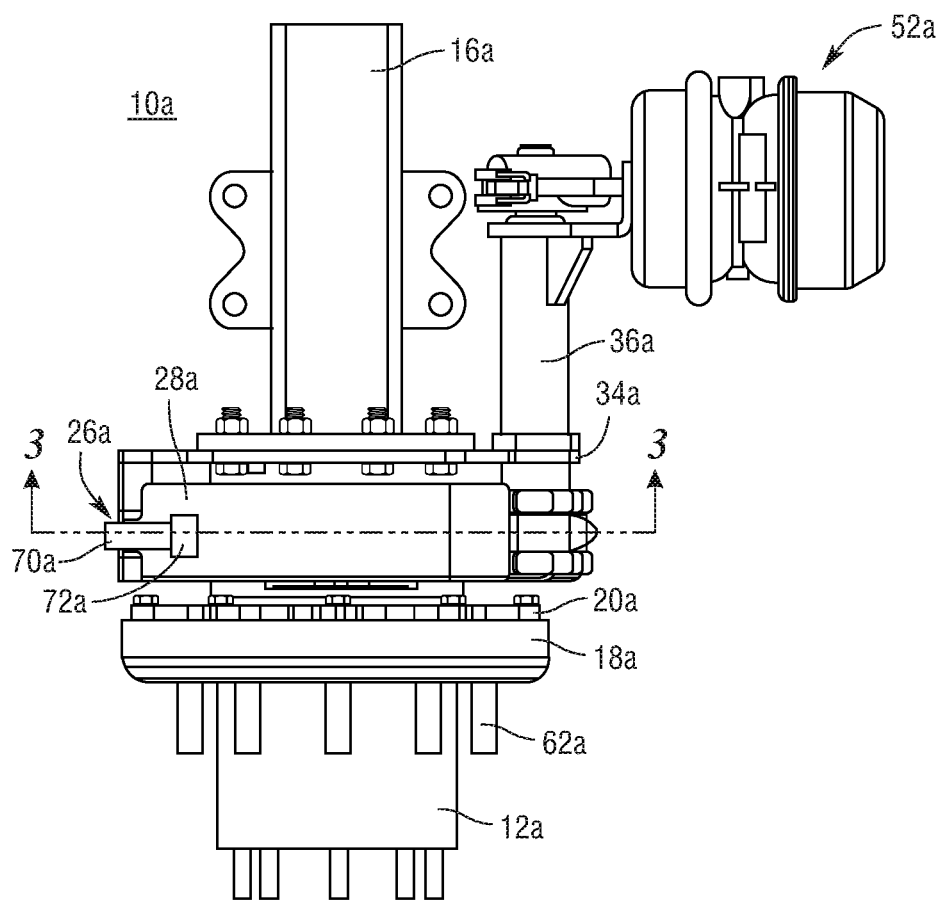
FIG. 14 is a top view of another embodiment of caliper actuated sphere braking system.
Figure 15:
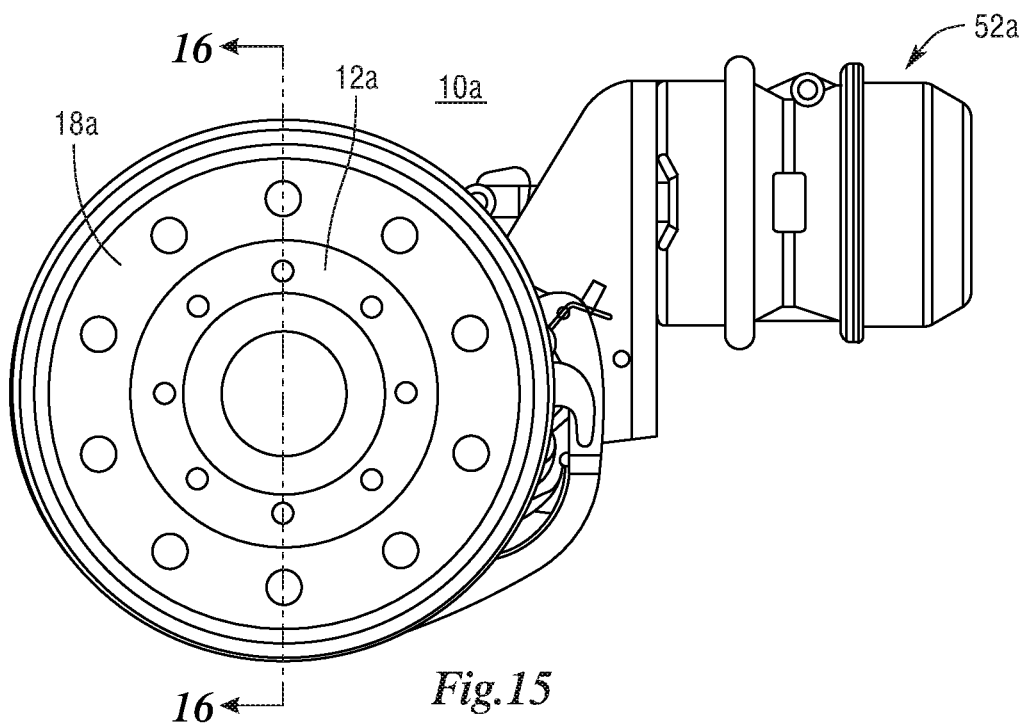
FIG. 15 is a front view of the caliper actuated sphere braking system of FIG. 14.
Figure 16:
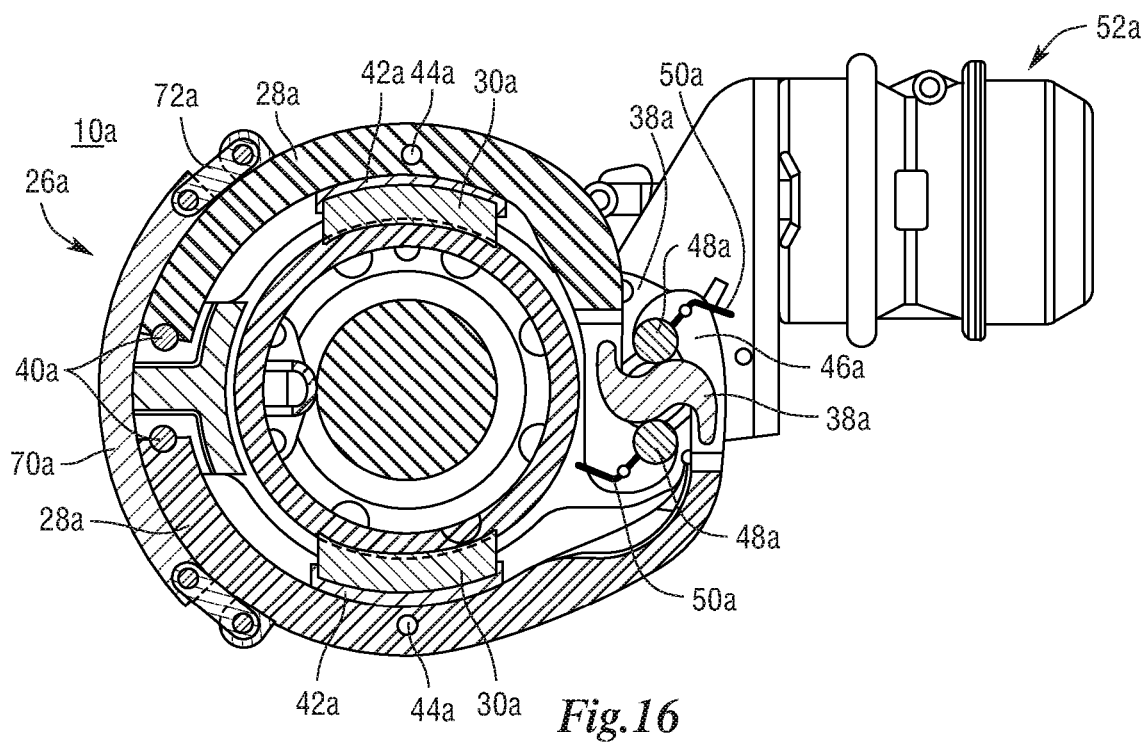
FIG. 16 is a cross-section view the caliper actuated sphere braking system of FIG. 14.
Figure 17:
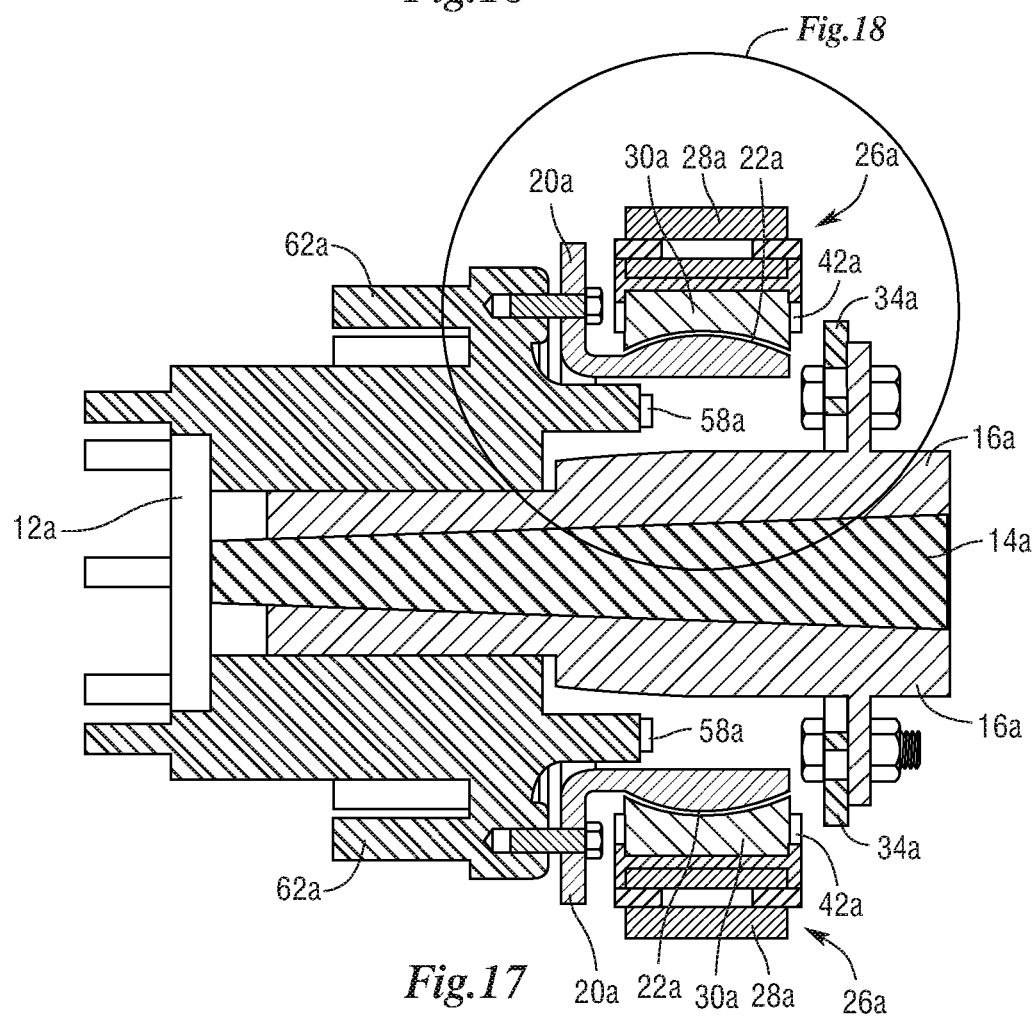
FIG. 17 is another cross-section view the caliper actuated sphere braking system of FIG. 14.
Figure 18:
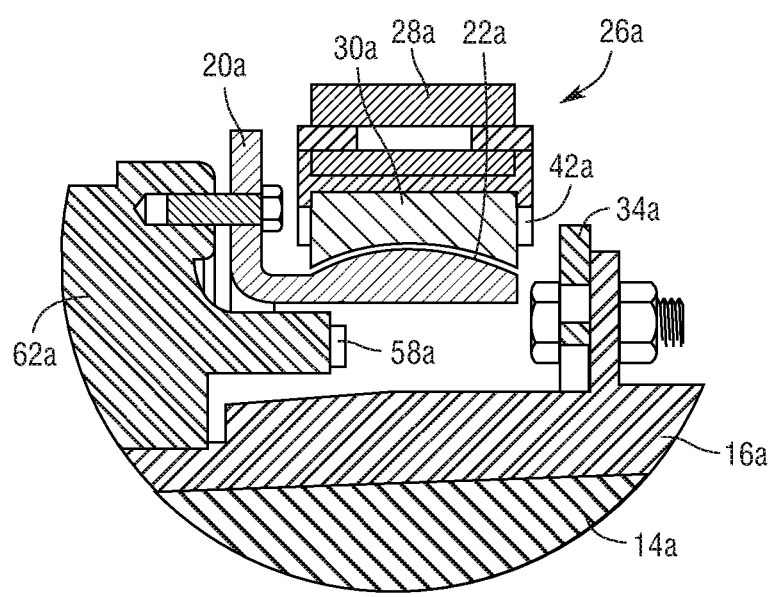
FIG. 18 is a close-up view of a portion of the caliper actuated sphere braking system of FIG. 17.

The embodiment does have one additional optional feature seen in FIGS. 14 and 16 and that is the inclusion of a retaining band 70a that is installed over the caliper arm assembly 26a. The retaining band 70a secures each caliper arm 28a against their respective caliper arm hinge pin 40a using a redundant fail-safe locking mechanism 72a. The retaining band 70a may be made of organic, metallic, or elastomeric material.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A braking system comprising:
a brake sphere rotor configured to be rotatably coupled to an axle; and
a caliper arm assembly that comprises:
at least one caliper arm extending at least partially in a circumferential direction;
hemispherical friction material extending at least partially in the circumferential direction and located between said at least one caliper arm and said brake sphere rotor, wherein the at least one caliper arm extends in the circumferential direction a greater distance than the friction material, and wherein the friction material is positioned radially outside the rotor; and
an actuator which is configured to apply a force to the at least one caliper arm at a circumferential location to cause the friction material to frictionally engage the rotor to thereby apply a braking force to the rotor, wherein the circumferential location is circumferentially offset from the friction material.

2. The braking system of claim 1 wherein the brake sphere rotor is mounted to a wheel hub of the axle, and wherein the braking system further comprises a hub adapter mounted to said wheel hub between said brake sphere rotor and said wheel hub.

3. The braking system of claim 1 in which said at least one caliper arm comprises at least two caliper arms.

4. The braking system of claim 1 in which said caliper arm assembly is activatable to press said hemispherical friction material radially inward against said brake sphere rotor.

5. The braking system of claim 1 in which said caliper arm assembly is located external to said brake sphere rotor.

6. The braking system of claim 1 in which said caliper arm assembly is actuated by at least one of mechanical power, pneumatic power, electric power, or hydraulic power.

7. The braking system of claim 1 further comprising:
a support bracket assembly mounted to an axle housing;
wherein said support bracket assembly supports a camshaft tube, and a camshaft; and
said caliper arm assembly is mounted to said support bracket assembly and connected to said camshaft.

8. The braking system of claim 1 further wherein said hemispherical friction material is installed within a brake shoe and said brake shoe is mounted to said at least one caliper arm.

9. The braking system of claim 3 further comprising a camshaft configured to simultaneously mechanically engage the at least two caliper arms to cause the associated friction materials to frictionally engage the rotor to thereby apply a braking force to the rotor.

10. A system comprising:
a spherical rotor;
at least one caliper arm;
hemispherical friction material coupled to the at least one caliper arm and positioned between said at least one caliper arm and said rotor; and
an actuator configured to apply a force to the at least one caliper arm at a circumferential location to cause the friction material to frictionally engage the rotor to thereby apply a braking force to the rotor, wherein the circumferential location is circumferentially offset from the friction material, and wherein the friction material is positioned radially inside the at least one caliper arm.

11. The system of claim 10 wherein the at least one caliper arm is removably coupled to a wheel of a vehicle which is in turn coupled to an axle.

12. The system of claim 10 wherein the circumferential location is circumferentially offset from an entirety of the friction material.

13. The system of claim 10 wherein the at least one caliper arm is pivotally mounted such that when the actuator applies the force, such force causes the at least one caliper arm to move pivotally.

14. A system comprising:
a spherical rotor rotationally coupled to an axle;
a first caliper arm;
first hemispherical friction material coupled to the first caliper arm and positioned between said first caliper arm and said rotor, wherein the first hemispherical friction material is positioned radially outside the rotor;
a second caliper arm;
second hemispherical friction material coupled to the second caliper arm and positioned between said second caliper arm and said rotor, wherein the second hemispherical friction material is positioned radially outside the rotor; and
a camshaft configured to simultaneously mechanically engage the caliper arms to cause the friction materials to frictionally engage the rotor to thereby apply a braking force to the rotor.

15. The system of claim 14 wherein the camshaft is rotatable in a predetermined direction to thereby simultaneously engage the first and second caliper arms to move at least part of the first and second caliper arms radially inwardly.

16. The system of claim 14 wherein the first and second caliper arms are located at opposite radial positions relative to the axle.

* * * * *